Patented Aug. 6, 1935

2,010,154

UNITED STATES PATENT OFFICE 2,010,154

ETHER ACID ESTER OF POLYHYDRIC ALCOHOLS

Max H. Hubacher, Nitro, W. Va., assignor, by mesne assignments, to Herbert S. Kreighbaum, Akron, Ohio No Drawing. Application June 27, 1933, Serial No. 677,856

6 Claims. (Cl. 260—106)

This invention relates to ether acid esters of polyhydric alcohols.

One object of this invention is the provision of a new group of chemical substances which are of particular advantage as plasticizers for cellulose nitrate, cellulose acetate, cellulose ethers, and synthetic and natural resins and methods of preparing the same.

To obtain my new esters I react ether acids and polyhydric alcohols. First, typical examples of the ether acids and methods of making such acids will be given but I am not to be restricted to these examples. Then typical examples of the polyhydroxy or polyhydric alcohols or compounds will be given. Lastly typical esters will be set forth and methods of making such esters will be given. It is to be expressly understood, however, that the examples are not to be construed as limiting my invention but are given in order to present typical examples of practising my invention.

The ether acids employed in the preparation of these esters are of the type R—O—R'—COOH where R represents an alkyl or aryl group, and where R' represents an alkylene group, a chain containing alkylene groups and oxygen, a phenylene group, of which the following are typical examples:

1. $C_4H_9$—O—$CH_2$—COOH
   n-Butoxyacetic acid
2. $C_4H_9$—O—$CH_2$—$CH_2$—O—$CH_2$—COOH
   [Beta-n-butoxy-ethoxy] acetic acid
3. $C_4H_9$—O—$CH_2$—$CH_2$—O—$CH_2$—$CH_2$—O—$CH_2$—COOH
   [Beta - (beta'-n - butoxy-ethoxy) ethoxy] acetic acid
4. $C_6H_{11}$—O—$CH_2$—COOH
   Cyclohexyloxyacetic acid
5. $C_4H_9$—O—$CH_2$—$CH_2$—O—$C_6H_4$—COOH
   [Beta-n-butoxy-ethoxy] benzoic acid
6. $C_4H_9O$—$CH_2$—$CH_2$—O—$CH_2$—$CH_2$—COOH
   [Beta-n-butoxy-ethoxy] propionic acid These acids are all prepared by the reaction of metal alcoholates with halogenated acids. A typical example of the acids of Class 1 is the preparation of n-butoxy acetic acid which results when the sodium alcoholate of butanol is reacted with chloracetic acid according to the following reactions:

$2C_4H_9OH + 2Na = 2C_4H_9ONa + H_2$ $2C_4H_9ONa + Cl$—$CH_2COOH =$
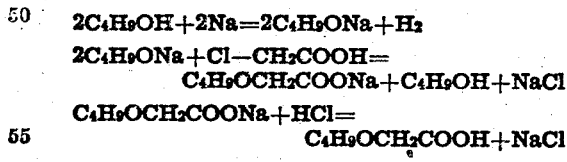

About 23 grams of freshly cut metallic sodium are slowly and cautiously added to about 450 cc. anhydrous normal butanol contained in a suitable flask equipped with stirrer and reflux condenser and cooled to about 20° C. When the sodium has all dissolved, a solution of about 47.5 grams monochloracetic acid in about 50 cc. anhydrous butanol is slowly added, the temperature being maintained between about 20 and 30° C. After the initial reaction is over, the mixture is heated to the refluxing temperature (about 110° C.) for about 90 minutes. The unreacted butanol is then removed by steam distillation and the water solution acidified by means of hydrochloric acid and cooled to zero degrees. The butoxy acetic acid is separated in the usual manner (weight of crude about 59.2 grams) and distilled in vacuo. The main fraction boils between about 139° and 144° C. at about 26 mm. pressure. The yield is about 37 grams. The boiling point at normal pressure is about 232.3–234.1° C.

A further example of acids of Class 1 is (beta-n-propyl-beta'-methyl-ethoxy) acetic acid, which may be prepared as follows: About 1600 cc. of commercial 2-methyl pentanol

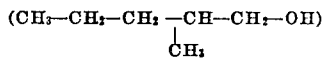

are placed in a suitable flask equipped with a reflux condenser and stirrer. To this are slowly added about 92 grams of freshly cut metallic sodium. During the addition of the sodium the temperature is maintained between about 20 and 30° C. When the sodium has all dissolved, a solution of about 189 grams of monochloracetic acid in about 200 cc. of methyl pentanol is cautiously run in. After the initial reaction the mixture is heated to the refluxing temperature for about two hours, and then the unreacted methyl pentanol is removed by steam distillation. The aqueous solution remaining is acidified by means of hydrochloric acid, whereupon the (beta-n-propyl-beta'-methyl-ethoxy) acetic acid is separated and distilled in vacuo. The main fraction distills between about 156 and 161° C. at 28 mm. pressure. The yield is about 239 grams.

It will be recognized that either primary, secondary or tertiary alcohols may be converted to alcoholates and reacted with halogenated organic acids preferably chloracetic, though chlorpropionic acid, chlorbutyric, chlorbenzoic, etc. may be used if desired. The position of the chlorine atom may be varied thus permitting one to prepare many acids of this family. For example, one may use alpha or betachlor propionic acid or alpha, beta or gamma chlorbutyric acid and so on.

Representative of the ether acids of Class 2 is [beta-n-butoxy-ethoxy] acetic acid. It may be prepared according to the following reactions:

(a) $2C_4H_9-O-CH_2-CH_2-OH+2Na = 2C_4H_9-O-CH_2-CH_2-ONa+H_2$ (b) $2C_4H_9-O-CH_2-CH_2-ONa + Cl-CH_2-COOH = C_4H_9-O-CH_2-CH_2-OCH_2-COONa+NaCl+C_4H_9-O-CH_2-CH_2-OH$ (c) $C_4H_9-O-CH_2-CH_2-O-CH_2-COONa + HCl = C_4H_9-O-CH_2-CH_2-O-CH_2-COOH+NaCl$

Beta n-butoxyethanol is offered to the trade under the commercial name of "Butyl Cellosolve". The detailed method for preparing [beta-n-butoxy-ethoxy] acetic acid is as follows:

About 1100 cc. of n-butoxy ethanol are placed in a suitable flask equipped with stirrer and reflux condenser and about 92 grams of freshly cut metallic sodium are cautiously added while keeping the temperature at about 30°. When the first part of the reaction is completed the temperature is gradually raised to not over about 105° C. About 3½ hours are required to completely dissolve the sodium. The solution of the sodium alcoholate is then cooled to about 25° C. and about 189 grams of monochloracetic acid dissolved in about 200 cc. Butyl Cellosolve are slowly added (60 minutes) keeping the temperature between about 25 and 30° C. Then the temperature is slowly raised during two hours to about 160° C. and then allowed to fall. The unreacted Butyl Cellosolve is then removed by steam distillation. The aqueous solution is next acidified by means of sulfuric acid and the crude acid which forms the upper layer is separated (about 409 g.) after which it is distilled. The main fraction of the ether acid boils between about 176 and 187° C. at about 27 mm. pressure (weight about 306 grams). On redistillation the pure acid boils at about 177 to 179° C. at about 25 mm. or at about 141° C. at about 4 mm. pressure. This acid boils at normal pressure at about 281-288° C. under partial decomposition. It has a specific gravity of about 1.0485 at 20°.

In a similar manner one may employ other alkoxy alcohols e. g. beta-methoxyethanol. Beta-ethoxyethanol, beta-n-propoxyethanol and the like. Thus [beta-methoxy-ethoxy] acetic acid boils at about 121-122° C. at about 4 mm. (of mercury) pressure; [beta-ethoxy-ethoxy] acetic acid boils at about 125-126° C. at about 4 mm. and [beta-n-propoxy-ethoxy] acetic acid boils at about 131° C. at about 4 mm. pressure. Instead of monochloracetic acid one can employ chlorpropionic, chlorbutyric, chlorbenzoic acids and the like. The chlorine atoms may be in any position. Furthermore, one may employ those halogenated acids containing more than one atom of halogen e. g. dichloracetic acid, trichloracetic acid and the like and thus secure a multiplicity of oxyalkyl ether acids.

The ether acids of class 3 contain three ether oxygen atoms. A typical example is [beta (beta'-n-butoxy-ethoxy)ethoxy] acetic acid. It is conveniently prepared from the sodium salt of diethylene glycol monobutyl ether which may also be described as beta (beta'-n-butoxy-ethoxy) ethanol which material is sold in the trade under the name of "Butyl Carbitol". The ether acid may be secured as follows: About 3900 cc. of "Butyl Carbitol" are placed in a suitable flask equipped with stirrer and reflux condenser. About 277.6 grams of freshly cut metallic sodium are added slowly in nine portions. At the end the temperature is raised to about 120° C. and maintained until all the metallic sodium is dissolved which requires about 6 hours. Then a solution of about 567 grams of monochloracetic acid in about 600 cc. of "Butyl Carbitol" is slowly added, and the temperature maintained between about 120 and 125° C. during about 135 minutes. (The reaction is exothermic). Following the addition of all the chloracetic acid solution the temperature is maintained at about 120° C. for about two hours longer. The unreacted "Butyl Carbitol" is then removed as before by steam distillation but in this case a much longer time is required. The aqueous solution may then be acidified and the ether acid separated and distilled in vacuo.

In a similar manner other ether acids may be prepared from other monoalkyl ethers of diethylene glycol. For example, "Methyl Carbitol", i. e., methoxy diethylene glycol yields [beta (beta'-methoxy-ethoxy)-ethoxy] acetic acid, $$CH_3-O-CH_2-CH_2-O-CH_2-CH_2-O-CH_2-COOH$$

which boils at about 155-156° C. at about 4 mm. pressure. It will be observed that monoalkyl ethers of the higher glycols may also be employed. Thus I may use the mono-methoxy, ethoxy, butoxy etc. ethers of triethylene glycol in exactly the same manner preparing first the sodium alcoholates and then reacting with chloracetic acid or other halogenated acids to secure as end products a wide variety of ether acids containing four or more ether oxygen atoms in the molecule. In a similar manner I may use other halogenated acids such as chlorpropionic, chlorbutyric etc. Also the chlorine or other halogen atom may be in any other position. And again I may employ not only mono but di, tri, etc. halogen acids which may, of course, be done not only in the preparation of acids of Class #3 but also of all other classes of ether acids herein enumerated or other similar acids. The lower alkoxy acids such as diethoxy acetic are somewhat unstable and are best isolated in the form of their esters but the higher oxyalkoxy acids are much more stable. Typical of such acids is $$(C_4H_9O-CH_2-CH_2-O)_2CH-COOH$$

which may be prepared from the sodium alcoholate of butoxy ethylene glycol and dichloracetic acid.

The acids of Class 4 may be prepared from cyclic alcohols such as cyclohexanol and the like, by reacting their sodium salts with chloracetic acid ether with or without a suitable solvent such as ether.

The acids of Class 5 form another group of ether acids which results from the reaction of halogenated aromatic acids with the metallic alcoholates of simple alcohols and the mono, di, tri, etc. ether alcohols. An example of such products is [beta-n-butoxy-ethoxy] benzoic acid. It can be readily prepared from the sodium alcoholate of "Butyl Cellosolve" and chlorbenzoic acid. Again, the position of the halogen may be altered at will and more than one halogen may be present in the molecule of the aromatic acid employed. Thus I may combine di, tri, etc. chlorbenzoic acid with various metallic alcoholates.

In the foregoing I have indicated the various types of ether acids which may be employed in the preparation of my preferred group of esters. For this purpose I have selected as most suitable the polyhydric alcohols of which the following are typical examples, but, of course, I am not to be restricted to those named.

A. HO—CH₂—CH₂—OH
   Ethylene glycol
B. HO—CH₂—CH₂—O—CH₂—CH₂—OH
   Diethylene glycol
C. HO—CH₂—CH₂—O—CH₂—CH₂—
                    O—CH₂—CH₂—OH
   Triethylene glycol
D. OH—CH₂—CH—OH—CH₂—OH
   Glycerol
E. OH—CH₂—CH—OH—CH₂—O—
              CH₂—CH—OH—CH₂—OH
   Di-glycerol
F. OH—CH₂—CH₂—CH₂—OH
   Propylene glycol
G. CH₃—CH—OH—CH₂—CH₂—OH
   1.3 butylene glycol
H. OH—CH₂—(CH—OH)₄—CH₂—OH
   Mannitol
I. OH—CH₂—CH—OH—CH₂—O—C(=O)—(CH₂)₁₀CH₃
   Glycerol monolaurate
J. OH—CH₂—CH(OH)—CH₂—O—C₄H₉
   Glycerol monobutyl ether
K. OH—CH₂—CH(OH)—CH₂—O—
              CH₂—CH₂—OC₄H₉
   Glycerol monobutoxy ethyl ether
L. OH—CH₂—CH(OH)—CH₂—OCH₂—
              CH₂—OCH₂—CH₂—O—C₄H₉
   Glycerol mono-(butoxy ethoxy)-ethyl ether It is to be understood that in addition to the substances above indicated for the purpose of esterification by my various groups of ether acids I also include all neutral substitution products thereof, provided, of course, that more than one hydroxy group remains unchanged.

All of the above polyhydroxy compounds may be esterified through one or more hydroxy group by reaction with the ether acids indicated above. The methods of condensation to be followed vary with the type of compounds to be esterified. Thus the alcohols indicated under Classes A, B, C, D, E, F, G and I, react easily with all the various ether acids splitting off water according to the following general reaction when heated:

$$R-OH+R'COOH = R-O-\overset{O}{\underset{\|}{C}}-R'+H_2O$$

where R is the alcohol radical and R' the ether acid radical. The term "radical" as used herein includes the meaning of the word "rest" as understood in German technology. This reaction may be assisted by:

(a) The presence of a small quantity (about 1%) of an acid catalyst such as sulfuric acid (conc.) or hydrochloric acid gas or in some cases by the addition of aqueous hydrochloric acid. In several instances this is not necessary as esterification proceeds without a catalyst.

(b) In the case of high boiling acids and alcohols the mixture may be heated above the boiling point of water, in which case the water is evolved and the esterification progresses in a satisfactory manner.

(c) However, high boiling acids and alcohols esterify more satisfactorily if a moderate vacuum (20 to 50 mm. of mercury) is applied during the heating. The esterifying temperature should be sufficient to produce evolution of the water. Usually about 100 to 150° C. is satisfactory.

(d) When the acids form constant boiling mixtures with water it is often desirable to distill off the mixture of water and acid and thus remove the water approximately as fast as formed.

(e) Another satisfactory method is to conduct the esterification in the presence of benzol or toluol which is distilled through a column. The benzol or toluol forms a constant boiling mixture with the water liberated by the reaction and thereby removes it. The distillate is separated and the benzol or toluol returned to the reacting vessel whereas the water carried over is discarded.

The sugars similar to mannitol can be best esterified by first converting the ether acids to ether acid chlorides according to well known methods (see Richter's Organic Chemistry, 1922, Vol. I, page 269). The reaction may be illustrated:

$$R'COOH+PCl_5 = R'COCl+POCl_3+HCl$$

where R' is the ether acid radical. The hydroxy bodies are then subjected to the action of the ether acid chloride whereupon the following general reaction occurs:

$$R-OH+R'COCl = R-O-\overset{O}{\underset{\|}{C}}-R'+HCl$$

where R is alcohol radical and R' is the ether acid radical. All of the above hydroxy compounds can be esterified with my ether acids following one of the above mentioned reactions or those described in Richter's Organic Chemistry 1922, Vol. I, pages 265, 266 or 267. In general no common solvent is required, though in the case of esterification through the acid chlorides it may be desirable to use pyridine or other inert solvent for this purpose.

I will now give methods of preparing some of my new ether acid esters but I am not to be limited to those named, as I believe myself entitled to all similar compounds which come within the spirit and contemplation of my invention.

*Ester I.—Preparation of the glyceride of [beta-n-butoxy-ethoxy] acetic acid*

About 18.4 parts by weight of 100% C. P. glycerine (glycerol) were mixed with about 141 parts by weight of [beta-n-butoxy-ethoxy] acetic acid in a suitable reactor equipped with a stirrer, means for supplying heat, a short column, a condenser and a receiver. The mixture was heated to about 140°–150° C. under about 35 mm. (mercury) pressure for approximately 6 hours. The water liberated distilled over and carried with it a small quantity of the acid which was easily recovered. The reaction mixture was then vacuum distilled. The fraction boiling (vapor temperature) at about 255–275° C. at about 15 mm. (mercury) was taken as the main fraction. The yield mounted to 64 parts by weight. The product is a water white somewhat viscous liquid. For sake of brevity it will be mentioned hereafter as Ester I. Its structural formula is substantially as follows:

$$\begin{array}{l}CH_2-O-\overset{O}{\underset{\|}{C}}-CH_2-O-CH_2-CH_2-O-C_4H_9\\[2pt]CH-O-\overset{O}{\underset{\|}{C}}-CH_2-O-CH_2-CH_2-O-C_4H_9\\[2pt]CH_2-O-\overset{O}{\underset{\|}{C}}-CH_2-O-CH_2-CH_2-O-C_4H_9\end{array}$$

*Ester II.—Preparation of the glyceride of (beta-n-propyl-beta-methyl-ethoxy) acetic acid*

About 18.4 parts by weight of C. P. glycerine (anhydrous) were mixed with about 128 parts by weight of (beta-n-propyl-beta-methyl-ethoxy) acetic acid in the apparatus described under Ester I and heated to about 140-150° C. under a pressure of about 35 mm. for somewhat over four hours. Water was evolved as esterification progressed. When completed, the crude reaction mixture was vacuum distilled and fractionated. The main fraction boiled with a vapor temperature of about 245-290° C. at about 20 mm. pressure. The yield amounted to about 86 parts by weight (96% theory yield). This ester is a practically colorless, slightly viscous liquid. Its structural formula is substantially as follows:

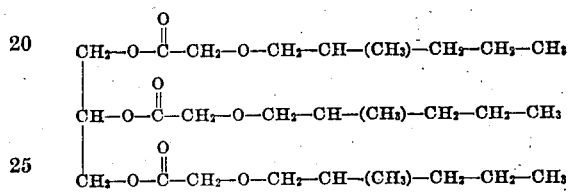

It will be mentioned hereafter as Ester II.

*Ester III.—Preparation of the diethylene glycol ester of (beta-n-propyl-beta-methyl-ethoxy) acetic acid*

About 21.2 parts by weight of diethylene glycol were mixed with about 128 parts by weight of (beta-n-propyl-beta-methyl-ethoxy) acetic acid in the apparatus described under Ester I. The mixture was heated to about 140 to 150° C. for 8 hours under a pressure of about 35 mm. Water came off as the esterification progressed. When completed the crude product was fractionally distilled under vacuum. The main fraction boiled with a vapor temperature of about 226 to 234° C. at about 15 mm. (mercury) pressure. The yield was about 75 parts by weight. The product is a practically colorless mobile liquid, insoluble in water and only very slowly hydrolyzed by dilute caustic. Its structural formula is substantially as follows:

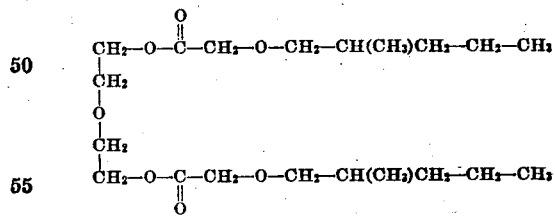

It will be designated hereafter as Ester III.

*Ester IV.—Preparation of the diethylene glycol ester of [beta-n-butoxy-ethoxy] acetic acid*

About 46.5 parts by weight of diethylene glycol were mixed with about 231.6 parts by weight of (beta-n-butoxy) acetic acid and heated to about 125-130° C. (thermometer in the reacting mixture) for 2½ hours until no more water came over under vacuum (pressure about 50 mm. of mercury). The water coming over carried a small quantity of the ether acid. The crude ester was fractionally distilled in vacuo. The first fraction up to about 185° C. (vapor temperature) at about 26 mm. was about 76.8 parts by weight. It consisted mainly of unreacted acid. The second fraction up to about 169-219° C. at about 8 mm. was about 25.5 parts by weight and consisted mainly of di-ester with about 64% acid. The third or main fraction distilled with a vapor temperature of about 219 to 263° C. at about 8 mm. (mercury) pressure and amounted to about 157.5 parts by weight. The product is a water white liquid of moderate viscosity and practically insoluble in water. The yield was about 85% of theory. Its structural formula is substantially as follows:

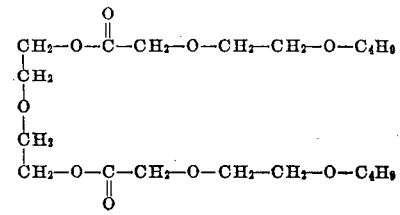

It will be designated hereafter as Ester IV.

[Beta-n-butoxy-ethoxy] acetic acid—

is a good typical example of the aliphatic ether acids. It is easily prepared in commercial quantities. The commercial method is substantially the same as the laboratory method above described except that larger quantities of materials are reacted and the equipment is metal. For the preparation of the sodium alcoholate and the sodium salt of the ether acid, iron equipment is satisfactory; beyond that, lead and glass enamel are preferable.

*Ester V.—Preparation of the triethylene glycol ester of (beta-n-propyl-beta-methyl-ethoxy) acetic acid*

About 45 parts by weight of triethylene glycol and about 144 parts by weight of (beta-n-propyl-beta-methyl-ethoxy) acetic acid were mixed and placed in the apparatus described under Ester I. The mixture was heated for about four hours until no more water came over to about 125 to 130° C. under a pressure of about 30 mm. When completed, the product was fractionally distilled in vacuo. The main fraction distilled with a vapor temperature of about 238-264° C. at about 8 mm. (mercury) pressure and amounted to about 119.1 parts by weight. The ester is a moderately mobile water white liquid. Its structural formula is substantially as follows:

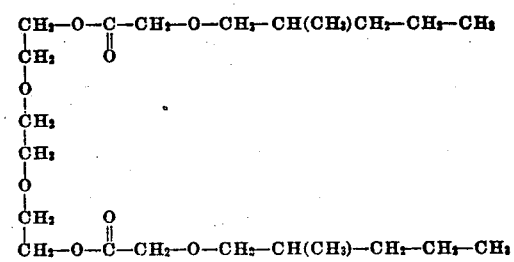

It will be designated hereafter as Ester V.

The following esters further illustrate my invention.

*Ester VI.—Ethylene glycol-di-butoxy-ethoxyacetate*

Structural formula:

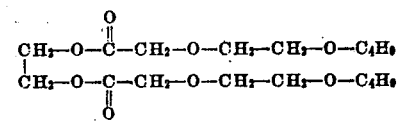

*Ester VII.—Triethylene glycol-di-butoxyethoxy-acetate*

Structural formula:

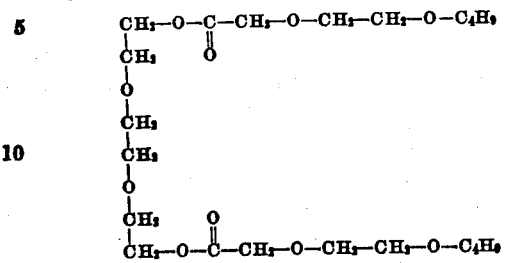

*Ester VIII.—Beta-propylene glycol-di-butoxyethoxyacetate*

Structural formula:

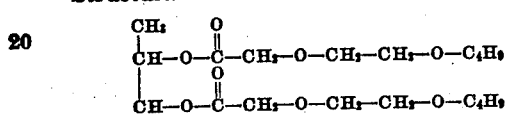

*Ester IX.—Glycerol monolaurate-di-butoxyethoxyacetate*

Structural formula:

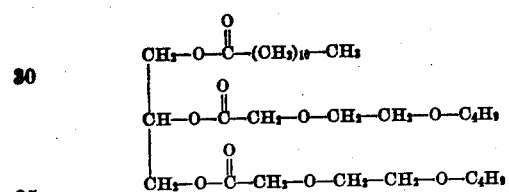

*Ester X.—Butoxy-glyceryl-di-butoxyethoxyacetate*

Structural formula:

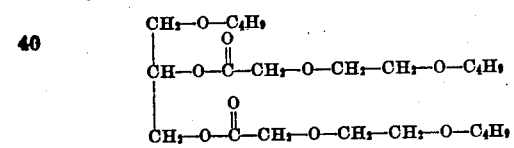

*Ester XI.—Diethylene glycol-di-butoxyethoxypropionate*

Structural formula:

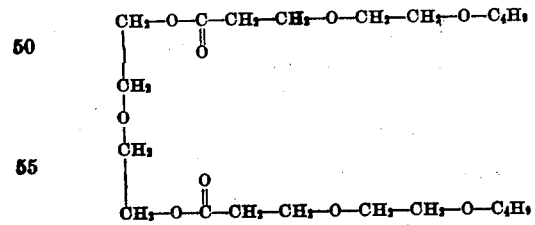

*Ester XII.—Triethylene glycol-di-butoxyethoxybutyrate*

Structural formula:

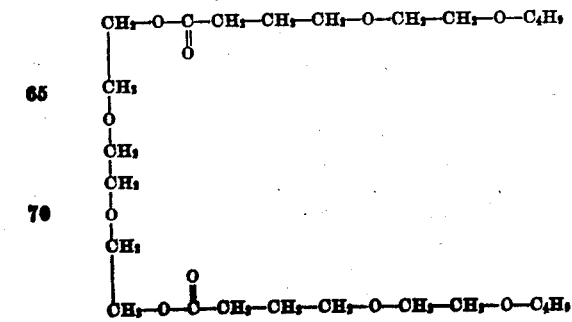

Polyhydric alcohols can easily be made to yield mixed esters. Examples of mixed esters of ether acids are:

*Ester XIII.—Mixed diethylene glycol ester of butoxyethoxyacetic acid and butoxyacetic acid*

Structural formula:

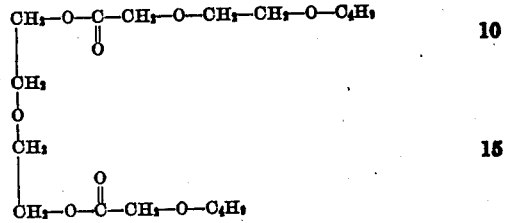

*Ester XIV.—Mixed diethylene glycol ester of butoxyethoxypropionic acid and butoxy-ethoxy-acetic acid*

Structural formula:

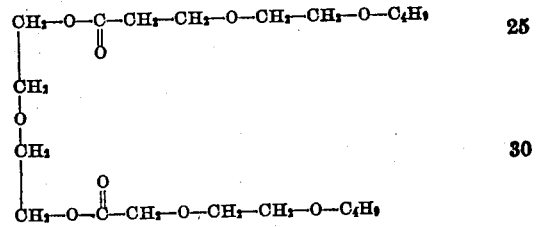

The above examples are typical of this class of esters. The general plan of their formation may be extended and a large number of similar ether acid esters of polyhydric alcohols prepared. Furthermore, the various ether acids or alcohols may contain a wide variety of substituted groups, e. g., halogen as chlorine, bromine etc; nitrogenous groups e. g. amino groups, nitro groups etc., sulfur groups and the like. Many similar combinations will readily occur to one skilled in the art.

My preferred group of esters are high boiling liquids which are excellent plasticizers for cellulose nitrate, cellulose acetate, cellulose ethers and the like. All of my esters exert a solvent action on cellulose nitrate and some, e. g. Ester IV, are good solvents for it. On the other hand, most of my esters are not solvents for cellulose acetate but several of them, particularly Ester IV are quite compatible with it and in this way very pliable and satisfactory cellulose acetate films may be produced. My esters and particularly Ester IV have a solvent action on many resins, both synthetic and natural.

What I claim is:

1. As a new product, diethylene glycol ester of [beta-n-butoxy-ethoxy] acetic acid.
2. As a new product, a glycol ester of [beta-n-butoxy-ethoxy] acetic acid.
3. As a new product, a polyhydric alcohol ester of [beta-n-butoxy-ethoxy] acetic acid.
4. As a new product, a diethylene glycol ester of a butoxy acetic acid.
5. As a new product, an ester of an aliphatic organic monocarboxylic acid containing oxygen in the form of an ether group with a polyhydric alcohol containing an ether group.
6. As a new product, a polyhydric alcohol ester of an aliphatic organic monocarboxylic acid, said acid containing two or more ether radicals.

MAX H. HUBACHER.